(12) United States Patent
Kühl et al.

(10) Patent No.: US 8,690,218 B2
(45) Date of Patent: Apr. 8, 2014

(54) VEHICLE BODY STRUCTURE WITH BODY REINFORCEMENT BEHIND THE SECOND ROW OF SEATS

(75) Inventors: Sönke Kühl, Heidelberg (DE); Klaus-Dieter Carle, Heilbronn (DE); Tobias Urban, Besigheim-Ottmarsheim (DE); Oliver Thaysen, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/499,209

(22) PCT Filed: Sep. 27, 2010

(86) PCT No.: PCT/EP2010/005887
§ 371 (c)(1),
(2), (4) Date: Mar. 29, 2012

(87) PCT Pub. No.: WO2011/038877
PCT Pub. Date: Apr. 7, 2011

(65) Prior Publication Data
US 2012/0181809 A1    Jul. 19, 2012

(30) Foreign Application Priority Data

Sep. 30, 2009 (DE) .......................... 10 2009 047 810

(51) Int. Cl.
*B62D 25/08* (2006.01)
(52) U.S. Cl.
USPC .................... 296/30; 296/193.08; 296/203.04
(58) Field of Classification Search
USPC ............. 296/187.12, 187.01, 193.08, 203.01, 296/203.04, 29, 30
See application file for complete search history.

(56) References Cited

U.S. PATENT DOCUMENTS 5,613,727 A * 3/1997 Yamazaki ................. 296/203.03
6,073,993 A * 6/2000 Iwatsuki et al. .......... 296/203.04
(Continued)

FOREIGN PATENT DOCUMENTS

DE    197 08 215 A1    7/1997
DE    199 54 575 A1    5/2000
(Continued)

*Primary Examiner* — Glenn Dayoan
*Assistant Examiner* — Pinel Romain
(74) *Attorney, Agent, or Firm* — Henry M Feiereisen LLC

(57) ABSTRACT

The invention relates to a vehicle body structure having a body reinforcement behind the second row of seats, the body reinforcement including a beam assembly which is formed from two opposite longitudinal side beams (9, 10), a floor crossbeam (4) and two vertical side beams (5, 6), of which in each case a left-side longitudinal side beam (9), an associated end of the floor crossbeam (4) and a left-side vertical side beam (5) are connected at a left-side nodal point (11) and, correspondingly, the second longitudinal side beam (10) is connected to the other end of the floor crossbeam (4) and the second vertical side beam (10) at a right-side nodal point, and, at the two nodal points, corner reinforcements being fitted for increased stiffening in the transverse plane of the floor crossbeam (4) and the vertical side beams (5, 6). According to the invention, the longitudinal side beams (9, 10) are cast aluminum longitudinal side beams, on which in each case at the nodal point (11) a corner reinforcement is formed and integrated as an corner reinforcing profile (13) made of uniform material and projecting in the manner of a box, wherein the associated vertical side beam (5, 6) is connected to the corner reinforcing profile (13) at the top on one hand, and is connected to the floor crossbeam (4) laterally on the other hand.

5 Claims, 4 Drawing Sheets

(56) References Cited

U.S. PATENT DOCUMENTS

| | | | |
|---|---|---|---|
| 6,139,094 A * | 10/2000 | Teply et al. ............... 296/203.03 |
| 6,203,099 B1 | 3/2001 | Iwatsuki |
| 6,283,539 B1 * | 9/2001 | Enning et al. ............ 296/203.03 |
| 6,568,745 B2 * | 5/2003 | Kosuge et al. ........... 296/193.02 |
| 6,568,747 B2 | 5/2003 | Kobayashi |
| 6,874,844 B2 * | 4/2005 | Vincenti ................... 296/203.04 |
| 7,237,833 B1 * | 7/2007 | Moll ............................ 296/204 |
| 7,300,099 B2 * | 11/2007 | Godfrey et al. ........... 296/187.12 |
| 7,341,299 B1 * | 3/2008 | Baccouche et al. .............. 296/30 |
| 7,448,674 B2 * | 11/2008 | Brunner et al. ........... 296/193.02 |
| 7,600,807 B2 * | 10/2009 | Bachmann ............... 296/187.08 |
| 7,631,926 B2 * | 12/2009 | Fonseka et al. ........... 296/187.12 |
| 7,900,995 B2 * | 3/2011 | Sato et al. ................... 296/187.1 |
| 7,942,473 B2 * | 5/2011 | Bellanger et al. .............. 296/204 |
| 7,963,588 B2 * | 6/2011 | Kanagai et al. ........... 296/187.12 |
| 8,002,337 B2 * | 8/2011 | Baccouche et al. ....... 296/203.02 |
| 8,287,035 B2 * | 10/2012 | Bufe et al. ................ 296/203.01 |
| 2002/0145307 A1 * | 10/2002 | Fujita ............................ 296/193 |
| 2003/0234557 A1 * | 12/2003 | Bock et al. ............... 296/190.08 |
| 2004/0094340 A1 * | 5/2004 | Kawasaki et al. ............ 180/65.1 |
| 2006/0158008 A1 * | 7/2006 | Nagashima ............... 296/203.03 |
| 2007/0152474 A1 * | 7/2007 | Lassl et al. ................ 296/187.12 |
| 2007/0228775 A1 * | 10/2007 | Godfrey et al. ........... 296/187.08 |
| 2008/0238148 A1 * | 10/2008 | Nakamura et al. ........ 296/203.01 |
| 2009/0146457 A1 * | 6/2009 | Kanagai et al. ........... 296/187.12 |
| 2009/0174220 A1 * | 7/2009 | Guo .......................... 296/187.12 |
| 2009/0289476 A1 * | 11/2009 | Bufe et al. ...................... 296/204 |
| 2010/0140978 A1 * | 6/2010 | Utsunomiya et al. .... 296/193.09 |
| 2010/0225145 A1 * | 9/2010 | Brunner et al. ........... 296/187.12 |
| 2011/0227368 A1 * | 9/2011 | Craig ........................ 296/187.12 |
| 2011/0260503 A1 * | 10/2011 | Fujii et al. ...................... 296/205 |

FOREIGN PATENT DOCUMENTS

| | | | |
|---|---|---|---|
| DE | 103 02 756 A1 | 7/2004 | |
| DE | 102004014664 | 10/2005 | |
| DE | 102004019750 | 12/2005 | |
| DE | 201004027377 | 12/2005 | |
| DE | 102006016607 | 10/2007 | |
| DE | 102006041090 | 4/2008 | |
| DE | 102006052992 | 5/2008 | |
| DE | 102008005341 | 8/2008 | |
| DE | 102008015268 | 11/2008 | |
| EP | 1 129 929 A1 | 9/2001 | |
| EP | 1 693 284 A1 | 8/2006 | |
| JP | 02041987 A * | 2/1990 | ............ B62D 25/20 |

\* cited by examiner

VEHICLE BODY STRUCTURE WITH BODY REINFORCEMENT BEHIND THE SECOND ROW OF SEATS

CROSS-REFERENCES TO RELATED APPLICATIONS

This application is the U.S. National Stage of International Application No. PCT/EP2010/005887, filed Sep. 27, 2010, which designated the United States and has been published as International Publication No. WO 2001/03/8877 and which claims the priority of German Patent Application, Ser. No. 10 2009 047 810.8, filed Sep. 30, 2009, pursuant to 35 U.S.C. 119(a)-(d).

BACKGROUND OF THE INVENTION

The invention relates to a vehicle body structure with a body reinforcement behind the second row of seats.

Such a generic body reinforcement is known from DE 10 2004 014 664 A1 and includes a beam assembly which is formed from two opposing longitudinal side beams, a floor crossbeam, and two vertical side beams. A left-side longitudinal side beam, an associated left end of the floor crossbeam, and a left-side vertical side beam are respectively connected to a left-side nodal point. Likewise, the second right-side longitudinal beam is connected with the right-side end of the floor crossbeam and the second right-side vertical side beam at a right-side nodal point. In addition, corner reinforcements are attached at both nodal points to provide increased stiffening in the transverse plane of the floor crossbeam and the vertical side beams.

Such corner reinforcements at the floor-side nodal points are well-suited and generally known measures to attain body stiffening in the rear body region, in particular against body twist as a result of operation and as protective measure against a crash from the side. DE 10 2004 027 377 A1 discloses, for example, an arrangement with a floor crossbeam which is guided on either end with a corner reinforcement over a longitudinal side beam and further is bent upwardly to a short vertical side beam element and connected with a wheel well carrier.

It is further generally known in the field of sedan bodies to improve the stiffness of the body in vehicles with a foldable rear bench seat in the area of the rear wheel wells and the rear window shelf by closing the generic beam assembly with an upper crossbeam to a torsional ring in the area of the rear window shelf. Also in this case, corner reinforcements of the floor-side nodal points are configured in a known manner by welding corner-reinforcing sheet-metal angles for material reinforcement.

A similar sheet-metal angle reinforcement is also implemented in a generally known manner in station wagons, using vertical side beams in the form of C-pillars which extend up to the roof region so as to realize also in this case a closed torsion ring via the roof structure.

The beam assembly arrangement disclosed in DE 10 2004 027 377 A1 has only a slight torsion-reducing effect as a result of the short vertical side beam attachment to the wheel wells. In addition, all beam assembly arrangements described above as related art are very complex to produce and to install, in particular when using separate corner reinforcement parts. Furthermore, each involves a conventional steel body construction without special measures to reduce weight.

In generally known modern vehicle bodies materials made of light metals or light metal alloys, in particular aluminum, are used in addition to aerodynamic designs to reduce fuel consumption in an environmentally friendly manner by saving weight. The stiffness and joining technologies for light metal components differ from the previous conventional, exclusive steel plate construction which poses problems that have to be solved with a material mix which is precisely adjusted to the respective site of the vehicle body, and a respective combination of components as well as cost-efficient and appropriate joining techniques for a use in large series.

SUMMARY OF THE INVENTION

It is an object of the invention to refine a generic vehicle body structure with body reinforcement behind the second row of seats in such a manner as to realize a cost-efficient and weight-beneficial structure with high stiffness.

This object is attained by constructing the longitudinal side beams as cast aluminum longitudinal side beams which have each formed and integrated thereon a corner reinforcement at each nodal point in the form of a corner reinforcing profile made of uniform material and protruding in a box-like manner. Connected to each of the two corner reinforcing profiles is the associated vertical side beam at the top, on one hand, and the associated end of the floor crossbeam on the side, on the other hand.

The use of a cast aluminum longitudinal side beam results in a weight-beneficial structure which can be easily and well suited to installation and stiffness demands. In addition, a corner reinforcing profile can be formed and integrated in such a casting in a simple and cost-efficient manner, without the need for additional corner reinforcement parts which have to be installed in addition. The direct connection of the floor crossbeam and a vertical side beam to a corner reinforcing profile also enables the application of a simple and stable joining technique so that the entire beam assembly for body reinforcement behind the second row of seats in the area of the rear wheel wells is especially weight-beneficial and cost-effective while effecting a good stiffening function.

To date, aluminum alloys are almost exclusively used as lightweight materials for cast and sheet metal elements in body construction and are designated in short as Alu-parts or aluminum parts also in the present application. Should other well-suited lightweight materials, such as for example magnesium alloys, become available in the future, the aforementioned is equally applicable for such materials and covered within the scope of protection.

According to a particularly preferred concrete embodiment, each cast aluminum longitudinal side beam has a cast aluminum beam shell member which faces the vehicle inner side and on which the corner reinforcing profile is formed as hollow profiled box which protrudes into the vehicle interior. The profiled box has a roughly triangular base shape to track the corner configuration to be reinforced and includes in vehicle longitudinal direction opposite roughly triangular box transverse walls, a box top wall, a box side wall, and a concavely formed transition zone.

A vertical side beam shell member facing towards the vehicle inner side is connected with a lap joint to formfittingly overlap the area of the box top wall or as an alternative engages behind a substantially U-shaped flange there. In like manner, a floor crossbeam shell member which faces towards the vehicle inner side is connected to the profiled box to formfittingly overlap with a lap joint the area of the box side wall. The floor crossbeam shell member is closed by the floor panel to form a floor crossbeam in the form of a hollow beam, when the body is fully assembled. Likewise, the vertical side beam shell members are closed by outer vehicle panels to form hollow beams.

The profiled box formed as described above in a cast aluminum beam shell member provides in conjunction with the indicated connection and joining techniques a particularly simple corner reinforcement which can be produced by casting in a cost-efficient manner, with the shell member also producible with reinforcing ribs in a particularly weight-beneficial manner and with relatively slight wall thicknesses and the required stiffness.

In addition, weight can be reduced while preventing contact corrosions by also producing the floor crossbeam or a floor crossbeam shell member, and the respective vertical side beam or a vertical side beam shell member, from aluminum sheet. The beam connections with the corner reinforcing profile are hereby advantageously realized by bonding and/or riveting. Possible joining processes for connecting the body parts further include MIG welding and FDS screws which advantageously require one-sided accessibility only for the connection site.

In sedan bodies, in particular in vehicles with foldable rear bench seats, the claimed beam assembly can be closed by an upper crossbeam in the area of a rear window shelf to form a floor corner reinforced torsion ring that has superior stiffness properties. The claimed beam assembly provides superior torsion reinforcement also in station wagons, in which case the vertical side beams are suitably components of the C-pillars that extend up into the roof area.

BRIEF DESCRIPTION OF THE DRAWING

An exemplary embodiment of the invention will be described with reference to a drawing.

It is shown in.

DETAILED DESCRIPTION OF PREFERRED EMBODIMENTS

Figure 1:
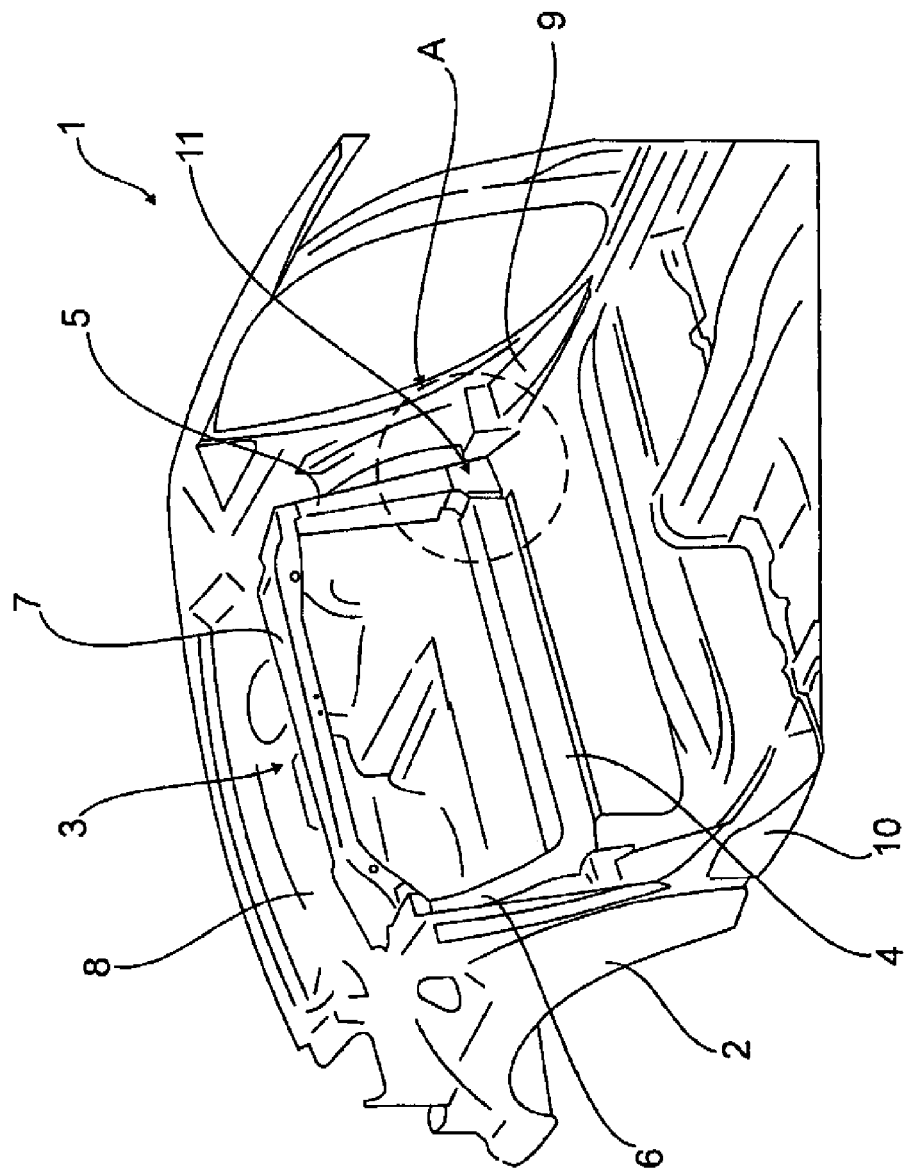
FIG. 1 a perspective top view of part of a body with body reinforcement behind a second row of seats, FIG. 2 an enlarged illustration of the area A of FIG. 1, FIG. 3 a side bottom view upon the object of FIG. 2 in viewing direction B, and FIG. 4 an illustration corresponding to FIG. 2 of an alternative embodiment.

FIG. 1 shows the rearward area of part of a body 1 for a sedan with foldable rear bench seat for increasing the trunk space. A torsion ring 3 is positioned in the area between opposite wheel wells 2 roughly in a vertical transverse plane for stiffening the body 1. This torsion ring 3 includes a floor crossbeam 4, a left-side vertical side beam 5, and a right-side vertical side beam 6 as well as an upper crossbeam 7 in the area of and at level with a rear window shelf 8 for connecting the vertical side beams 5, 6. In addition, the torsion ring 3 is connected at the floor-proximal corner regions to a left-side longitudinal side beam 9 and a right-side longitudinal side beam 10 at nodal points 11, respectively. The left-side nodal point 11, according to the area A in FIG. 1, is illustrated in detail with reference to FIGS. 2 and 3.

Figure 2:
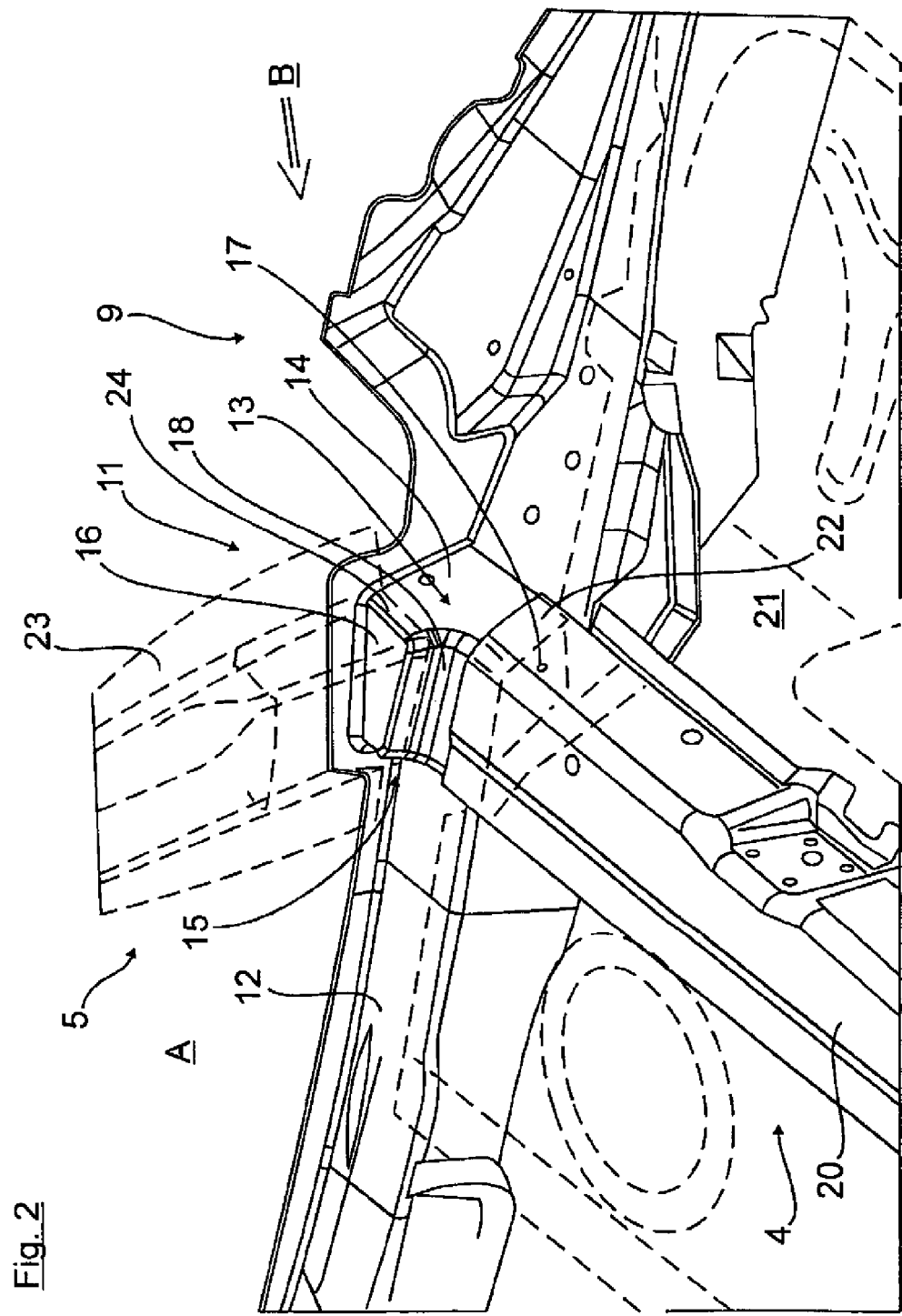
Figure 3:
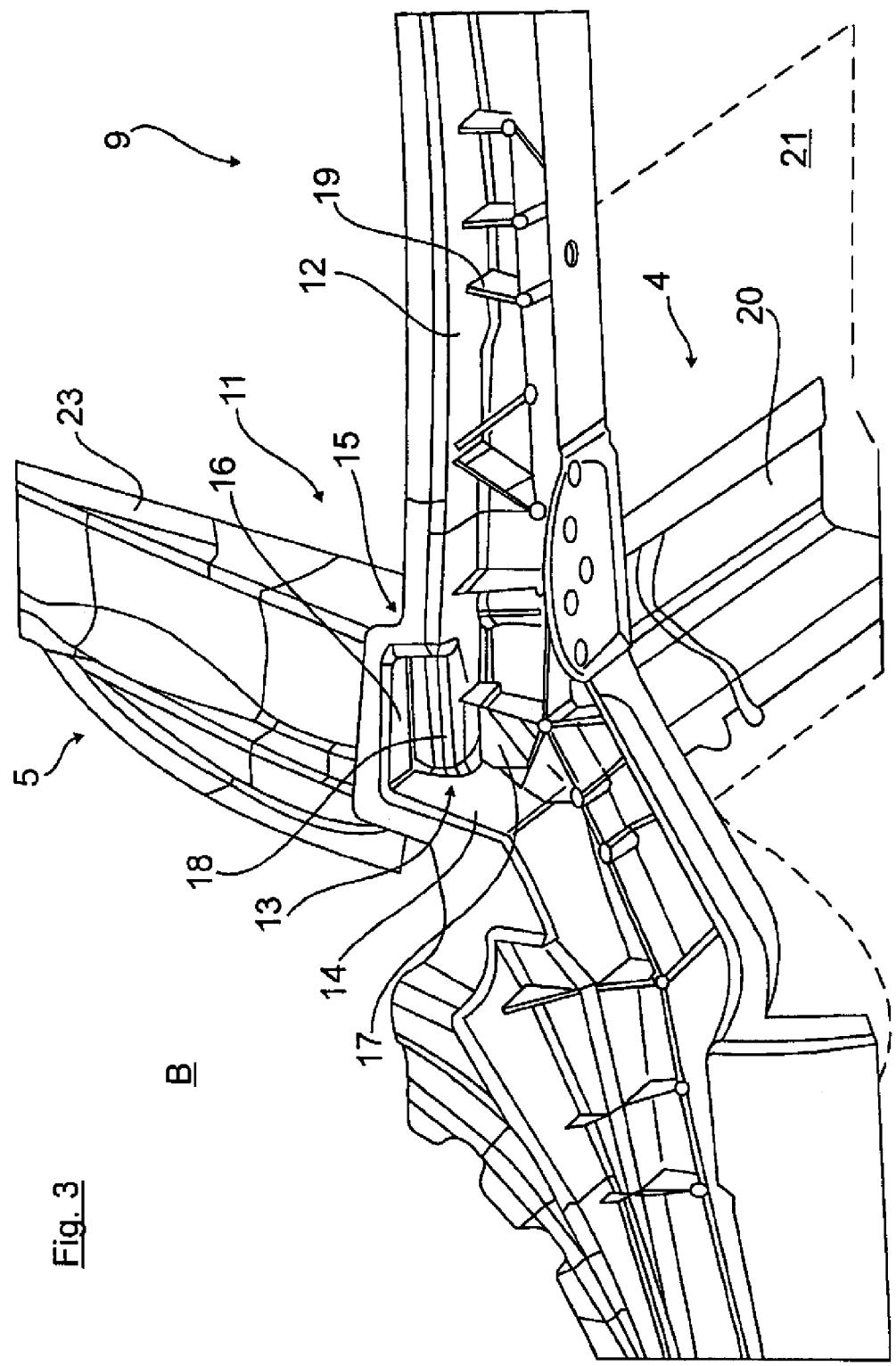

FIG. 2 involves hereby an enlarged view of the area A of FIG. 1, and FIG. 3 involves a side bottom view upon the object of FIG. 2, with a viewing direction roughly according to arrow B of FIG. 2. The longitudinal side beam 9 has a cast aluminum beam shell member 12 which has a shell outer side facing towards the vehicle inner side and which extends longitudinally along the left vehicle outer side and is complemented by an outer sheet to form a closed longitudinal hollow beam, when the body is finished. Formed on the cast aluminum beam shell member 12 in the transverse zone of the torsion ring 3 is a hollow profiled box 13 as corner reinforcing profile which protrudes into the vehicle interior.

The profiled box 13 has a basic box shape roughly in the shape of an L, including two opposite triangular box transverse walls 14, 15, a box side wall 17 as well as a concavely formed transition wall 18 between the top box wall 16 and the box side wall 17. The view according to FIG. 3 further shows the reinforcement of the cast aluminum beam shell member 12 in the interior zone with suitably secured reinforcing ribs 19 to maintain the required stiffness.

The floor crossbeam 4 has a floor crossbeam shell member 20 which is placed upon a floor panel 21 for formation of a hollow beam. The floor crossbeam shell member 20 has an end to formfittingly overlap with a lap joint 22 the area of the box side wall 17 and is secured there through bonding and riveting. Likewise, a vertical side beam shell member 23 of the vertical side beam 5 formfittingly overlaps with a lap joint 24 the area of the box top wall 16 and is secured there also through bonding and riveting. The floor crossbeam shell member 20 and the vertical side beam shell member 23 are made of aluminum sheet.

Figure 4:
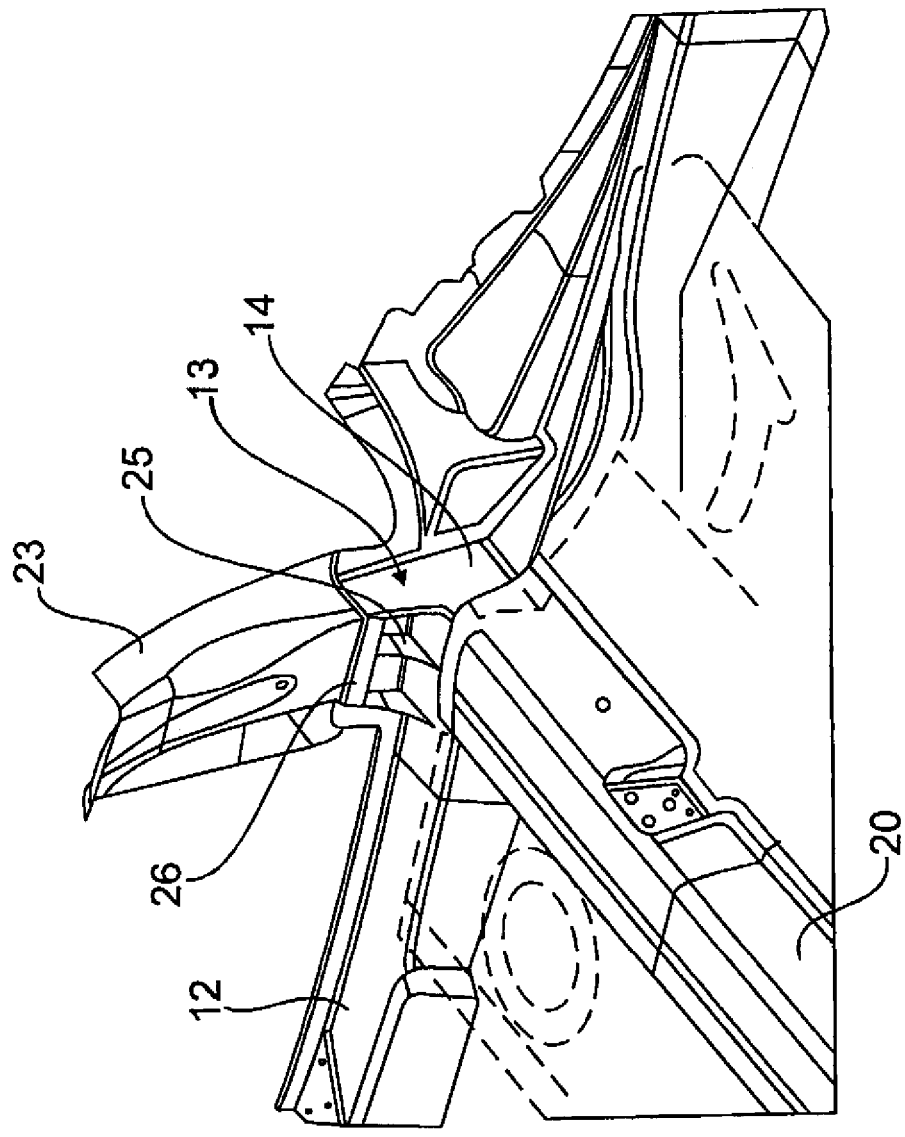

The alternative embodiment according to FIG. 4 substantially corresponds to the afore-described embodiment so that same reference signs are used for same parts. The profiled box 13 is configured here differently, whereby the box profile is open to the vehicle inner side, instead of the transition wall 18, and includes a central support web 25. In addition, the vertical side beam shell member 23 is connected in a different way as in the first embodiment.

In this embodiment, the vertical side beam shell member 23 has an end which formfittingly engages from outside behind a U-shaped flange structure 26 in the area of the box top wall like a plug connection. This second variant is able to provide possible advantages during assembly of the body. The mode of action is basically the same as in the first embodiment.

What is claimed is:

1. A vehicle body structure, comprising a body reinforcement behind a second row of seats, said body reinforcement comprising:

a beam assembly comprised of two opposite longitudinal side beams made of cast aluminum and defining a left-side longitudinal side beam and a right-side longitudinal side beam;

a torsion ring including a floor crossbeam made of sheet metal, and two vertical side beams made of sheet metal and defining a left-side vertical side beam and a right-side vertical side beam, wherein the left-side longitudinal side beam is connected to one end of the floor crossbeam and the left-side vertical side beam at a first nodal point, and the right-side longitudinal side beam is connected to another end of the floor crossbeam and the right-side vertical side beam at a second nodal point, and corner reinforcements being integrated in the torsion ring through casting at the first and second nodal points, respectively, for realizing a stiffening in a transverse plane of the floor crossbeam and the vertical side beams, each said corner reinforcement being configured as a corner reinforcing profile made of uniform material and protruding in the shape of a box and adapted for connection of an associated one of the vertical side beams at the top and the floor crossbeam on the side.

2. The vehicle body structure of claim 1, wherein each longitudinal side beam includes a shell member which faces an inner side of the vehicle for attachment of the corner reinforcing profile, said corner reinforcing profile having a configuration in the form of a hollow profiled box which projects into an interior of the vehicle, wherein the profile box has a roughly triangular base shape, as viewed in a vehicle longitudinal direction, to track a corner configuration and includes opposite triangular transverse box walls, a box top wall, a box side wall facing towards the inner side of the vehicle, and a concavely formed transition zone, wherein one of the vertical side beam has a shell member which faces towards the inner side of the vehicle and formfittingly overlaps an area of the box top wall with a first lap joint or engages there behind, and wherein the floor crossbeam has a shell member which faces towards the inner side of the vehicle and formfittingly overlaps the area of the box side wall with a second lap joint.

3. The vehicle body structure of claim 2, wherein at least one the floor crossbeam and at least the shell member of the floor crossbeam and at least one of the vertical side beams and at least the shell member of the vertical side beams are made of aluminum sheet.

4. The vehicle body structure of claim 3, wherein the corner reinforcing profile is connected to the beam assembly by at least one process selected from the group consisting of gluing, riveting, MIG welding, and FDS screws.

5. The vehicle body structure of claim 1, wherein in a sedan body the torsion ring includes an upper crossbeam in an area of a rear-window shelf to connect the vertical side beams and to provide a closed configuration of the torsion ring.

\* \* \* \* \*